United States Patent
Hellings

[19]

[11] Patent Number: 5,967,521
[45] Date of Patent: Oct. 19, 1999

[54] NON-TOXIC, EDIBLE, AND BIODEGRADABLE SKEET AND METHOD OF MAKING THE SAME

[76] Inventor: Deborah Hellings, P.O. Box 37247, Tallahassee, Fla. 32315

[21] Appl. No.: 08/970,855

[22] Filed: Nov. 14, 1997

[51] Int. Cl.⁶ ................................. F41J 9/16; A01K 5/00
[52] U.S. Cl. ............................................. 273/363
[58] Field of Search .................................... 273/362, 363

[56] References Cited

U.S. PATENT DOCUMENTS 5,174,581  12/1992  Goodson ................................. 273/363
5,467,998  11/1995  Hellings ................................. 273/363

*Primary Examiner*—William H. Grieb
*Attorney, Agent, or Firm*—Carnes Cona & Dixon

[57] ABSTRACT

The present invention is an environmentally safe composition of a non-toxic, edible, biodegradable skeet that is used for trap shooting. The skeet of the present invention is designed in such a way that it can be stacked, and to withstand the throwing force of the trap. The skeet is fabricated from a mixture of a binder, water and a filler. The binder is egg, the filler is an edible substance, such as bird seed.

14 Claims, 1 Drawing Sheet

NON-TOXIC, EDIBLE, AND BIODEGRADABLE SKEET AND METHOD OF MAKING THE SAME

BACKGROUND OF THE INVENTION

1. Field of the Invention

The present invention relates generally to a composition for a skeet used in traps or the like, and more particularly to a skeet which is environmentally friendly by providing a skeet that is completely biodegradable, non-toxic and edible.

2. Description of the Prior Art

Target practice with fire arms is commonly done to improve one's aim. Various forms of practicing exists. One such form is to utilize skeet, which are also known as clay pigeons. These skeet are typically mechanically tossed in the air to allow a sportsmen to aim at the tossed skeet. To provide for a more realistic environment of a pigeon, or the like, flying through the air, these practices will take place in a wooded area generally inhabited by wildlife.

Once hit, the skeet will shatter and the remains will be left in the particular wooded area. Unfortunately, most skeet used today are designed and configured of clay which is toxic as well as non-biodegradable. This toxic and non-biodegradable material can be detrimental to the environment as well as to the wildlife which inhabits the particular area. Hence, attempts have been made to reduce, if not eliminate the toxic components of the skeet, particularly the clay.

One such skeet is disclosed in U.S. Pat. No. 5,174,581 issued to Goodson. In this patent there is disclosed a skeet that non-toxic, edible and most importantly, biodegradable. This skeet is composed of mainly sugar and bird seed. Though the results were satisfactory, the pigeons were costly, brittle, and limited in ingredients.

What is needed is a skeet which will overcome the deficiencies, drawbacks and shortcomings of prior skeet since none of these previous efforts provide the benefits intended with the present invention, such as providing a skeet which is economically feasible, durable, biodegradable, non-toxic as well providing a skeet whose aerodynamic characteristics are not sacrificed. Prior techniques do not suggest the present inventive combination of component elements as disclosed and claimed herein. The present invention achieves its intended purposes, objectives and advantages over the prior art device through a new, useful and unobvious combination of component elements, which is simple to use, with the utilization of a minimum number of functioning parts, at a reasonable cost to manufacture, assemble, test and by employing only readily available material.

SUMMARY OF THE INVENTION

The present invention provides a skeet device which is non-toxic, edible, biodegradable as well as providing a skeet who's composition does not affect its aerodynamic flight when toss via a conventional mechanical disk throwing apparatus, known as a trap. The skeet of the present invention is intended to have the same weight and flying characteristics of conventional clay skeet, but which are not insidious nor harmful to the environment and its inhabitants.

The present invention comprises binder, water, and at least one non-toxic filler, preferably an edible substance, such as birdseed. For providing a longer lasting product, a preservative, such as salt, may be included.

The final product is an edible skeet which is generally fabricated in a saucer shape. This shape will allow the skeet to be placed in the conventional mechanical disk throwing apparatus. The unique combination and formulation of elements produces a skeet that is easily breakable by a shotgun blast as well as being strong enough to withstand the force of the mechanical disk throwing apparatus. This unique combination of the shape and the composition of the final product produces a skeet that has an aerodynamic structure as well as being a skeet which is environmentally safe and non-toxic to the environment and its inhabitant.

The use of the various materials will provide a skeet which can provide food for the local animals. Since the product is biodegradable, the non-consumed items will be safely absorbed in the earth. The use of the various components of the skeet provides for a device which can be tailored to a specific need or environment. To provide for an aesthetically pleasing product, or one which looks more like a conventional clay skeet, food coloring, soy ink coloring substances, or the like, can be utilized. These additions are utilized for enhancing the visibility of the skeet of the present invention.

Accordingly, it is the object of the present invention to provide for a skeet which will overcome the deficiencies, shortcomings, and drawbacks of prior skeet and methods thereof.

Another object of the present invention is to provide for a non-toxic skeet that possesses all of the qualities of a clay pigeon, yet will not be detrimental to the environment nor its inhabitants.

Still another object of the present invention is to provide for a non-toxic skeet that is biodegradable, inexpensive to fabricate, durable when released from the disk throwing apparatus, possessing aerodynamic characteristics and which can break and shatter once contact has been made with a bullet, pellet or the like.

It is yet another object of the present invention to provide for a non-toxic biodegradable skeet to which various elements can be added to adapt the skeet to a specific environment and/or region in which it is used.

Another object of the present invention, to be specifically enumerated herein, is to provide a skeet in accordance with the preceding objects and which will conform to conventional forms of manufacture, be of simple construction and easy to use so as to provide a skeet device that would be economically feasible, long lasting and relatively trouble free in operation.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the invention. It should be appreciated by those skilled in the art that the conception and specific embodiments disclosed may be readily utilized as a basis for modifying or designing other structures for carrying out the same purposes of the present invention. It should also be realized by those skilled in the art that such equivalent structures do not depart from the spirit and scope of the disclosed invention. Accordingly, a fuller understanding of the invention may be had by referring to the detailed description of the preferred embodiments in addition to the scope of the invention defined by the claims.

BRIEF DESCRIPTION OF THE DRAWINGS

Similar reference numerals refer to similar parts throughout the several views of the drawings.

DESCRIPTION OF THE PREFERRED EMBODIMENTS

Figure 1:
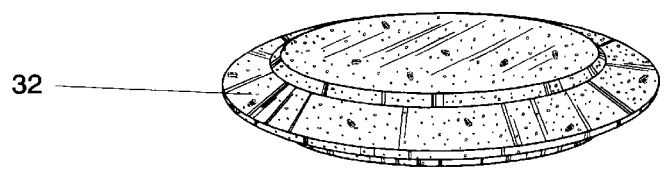
FIG. 1 is a perspective view of the skeet of the present invention.
Figure 2:
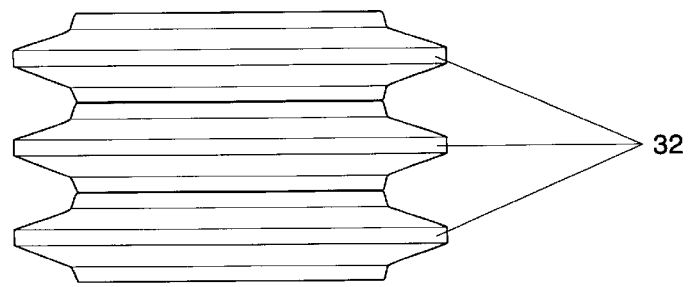
FIG. 2 is a side view of a plurality of skeet in a stacked position.
Figure 3:
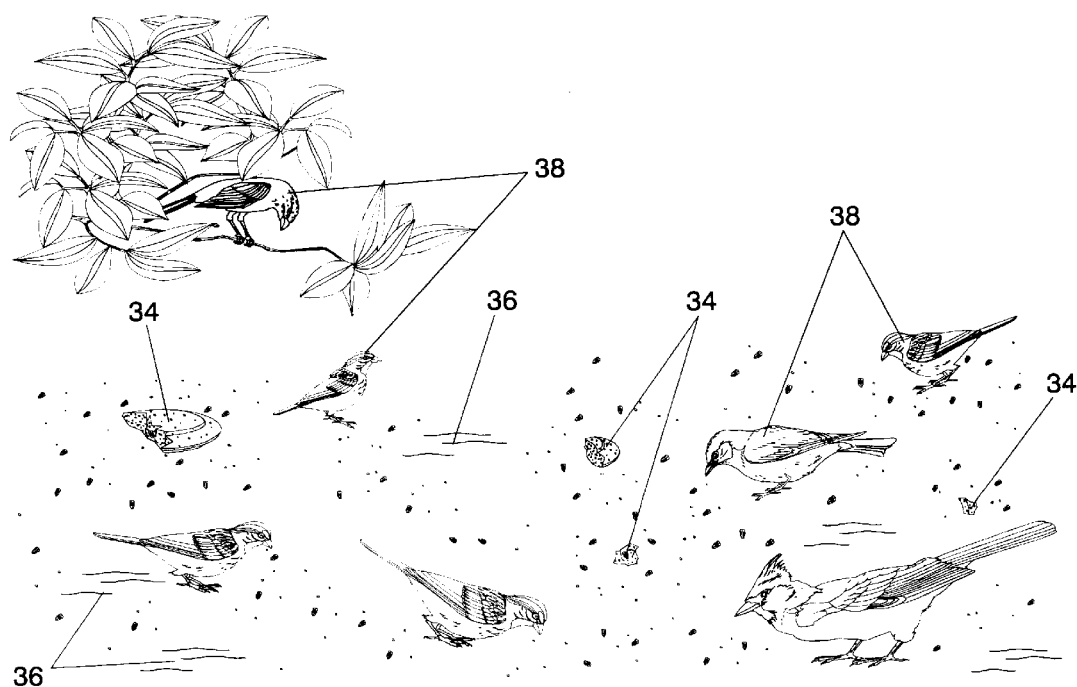
FIG. 3 is an environmental perspective view of the instant invention after being hit by a marksman, being eaten by local birds.

The present invention is drawn to a compound which forms a skeet that is used for trap shooting. The present invention 32, as seen in FIGS. 1–3 is shown and uniquely combines ingredients or elements to produce a skeet that is non-toxic, edible, as well as being biodegradable. The combination of the ingredients produces a skeet that retains its aerodynamic structure as well as being beneficial to the environment.

To aid in maintaining the aerodynamic structure of the skeet of the present invention, the compound is generally fabricated in a standard skeet mold. The use of a mold will produce a product which is similar in size, shape and design of conventional skeet, without utilizing toxic material.

The present invention comprises binder, water and at least one non-toxic filler, preferably an edible substance, such as birdseed. For providing a longer lasting product, a preservative, such as salt, may be included. The non-toxic filler can be at least one non-water soluble edible substance, at least one additive, or a combination thereof. Optionally, a biodegradable polymer can be utilized as a filler.

The primary ingredient in the compound for the skeet is the filler. The filler is the material which is generally non-water soluble and which will generally be enjoyed by the environment. The filler can include, but not be limited to: bird seed (millet, milo, sorghum, sunflower seed, or combination thereof), corn (whole, cracked, meal, or combination thereof), grain (wheat, barley, oats, bran, feed or combination thereof), process grain products (quick cooking grits, cream of wheat, quick cooking rice, or the like), rice (brown, white, or a combination thereof), grass (rye, hay, straw, or a combination thereof) wood (cypress mulch, pine, pin needles, cedar, or a combination thereof), a combination thereof, or the like.

Using an edible substance as the filler will provide for the shatter skeet to be consumed by the local inhabitants of the area of target practice. The non-toxic material will be beneficial to the inhabitants and not detrimental. The concentration used for the binder is generally 40–70% weight. If using more than one material, the combination of material is within the range specified above.

A non-toxic additive can be added to the solution. The additives can include bone meal, deciduous earth, processed grits, cream of wheat, ground quick cooking rice, manure, non-toxic fertilizer, non-toxic insecticide, flake fish, squid, squid juice, a combination thereof, or the like.

One type of non-toxic insecticide is deciduous earth. Deciduous earth consists of ground limestone containing the sharp particles of fossilized shells. The sharp edges of a shell can cut the particular insect, such as fire ants, causing sever damage and possible death of the insect, while not causing harm or injury to the other animals of the particular environment. The use of ground or flake fish food may be considered ideal when shooting over water.

The non-toxic fertilizer, such as bone meal, manure or the like which can be added may inherently improve soils. The insecticide that is non-toxic to animals and humans, such as deciduous earth, process grits, cream of wheat or ground quick cooling rice can be added discourage ants.

Using a non-toxic additive serves to adapt the biodegradable skeet to the environment in which it will be used. The concentration used for the additive is minimal and is generally 1%–5% of the total liquid used in the compound.

For additional strength and for increasing the shelf life of the skeet, a desiccant can be used. The desiccant will increase the strength of the skeet, enabling the device to be placed in a mechanical trap. The desiccant can include, but not be limited to; salt, sugar, baking soda, baking powder, or a combination thereof. The desiccant is approximately 1%–8% weight.

To bind the compound, a binding substance is used. The binding material, along with the water, will allow the skeet to maintain its shape. The binding material is preferably egg. The total amount of egg is approximately 3–8%.

Water is also used in the formulation of the skeet. The amount of water is approximately 20–40% weight. The water will assists in maintaining the structural integrity of the final product.

The skeet of the present invention may be colored for enabling easier visibility. In order to accomplished this task, food coloring, fish ink, or the like may be added in the mixture. Optionally, the cooked skeet may be painted with a non-toxic paint product.

In order to fabricate the skeet of the present invention, the dry ingredients are mixed together until a homogenous state is met. The combination of the dry ingredients form a mixture. To this mixture the water and the binder (binding substance) and any other liquid (such as dyes, or the like) are added and the solution is mixed. The mixed water solution is then placed in a skeet mold and the compound is treated by heat.

The heating or cooking process includes baking the compound at a medium to high temperature (approximately 325–400 degrees C). Baking will permit for heat to be applied at a constant rate. The heat will enable the substance to harden. After the mixture has been cooked and hardened, it is cooled and removed from the mold. The final weight of the cooked skeet will be approximately 3.0 to 5.0 ounces, similar to conventional skeet. Once cooled, the skeet may be painted.

These skeet are shaped to be stacked and transported as seen in FIG. 2, while retaining their structural integrity. The combination of ingredients and final weight enables the skeet to withstand the throwing force of the trap mechanism, while maintaining its aerodynamic structure. Additionally, the skeet are also designed and constructed to shatter as seen in FIG. 3, into fragments 34 when hit by a marksman, thus satisfying the victory condition for the sport of skeet shooting. Once shattered, the edible pieces 36 of the skeet can be consumed by the local inhabitants 38 of the area.

The effectiveness of formulation made in accordance with the teaching of the present invention is illustrated by the following example. In the example provided, the parts are given by weight.

EXAMPLE

The following example is a typical product which has been utilized to produce favorable and successful results.

| Compound | Substance | Concentration |
| --- | --- | --- |
| Filler | Bird Seed | 55.9% |
| Non-Toxic Additive | Squid | 1% of the total water used |
| Water | Water | 35% |
| Desiccant #1 | Salt | 1% |
| Desiccant #2 | Sugar | 3% |
| Binder | Egg | 5% |

The above identified composition was prepared as defined above. Hence, the filler, the first and second desiccant were mixed until a homogeneous mixture was achieved. The water, binder and non-toxic additive was then added. This combination was mixed until a homogeneous mixture was obtained. The homogenous mixture was placed in a skeet mold and baked and cooled. This process was continued for fabricating a plurality of skeet.

The skeet were used in trap shooting. It was observed that the skeet performed as well as conventional clay skeet. The flying performance was not sacrificed, thereby providing a skeet which is not only aerodynamic, but non-toxic as well.

When hit by a bullet, the skeet shatter and its fragments scatter to the ground below to be enjoyed by the local animals and environment.

While the invention has been particularly shown and described with reference to an embodiment thereof, it will be understood by those skilled in the art that various changes in form and detail may be made without departing from the spirit and scope of the invention.

I claim:

1. A non-toxic, edible, and biodegradable flying target comprising:
    a baked compound of materials;
        said baked compound comprises a binder, water, and a filler;
        said binder is egg;
        said filler is non-toxic, edible and biodegradable;
        said flying target having an aerodynamic structure and constructed to retain its integral configuration when thrown by a trap mechanism and is easily breakable by a shotgun blast.

2. A non-toxic, edible, and biodegradable flying target as in claim 1 wherein said filler is a primary ingredient and is at least 40 percent of the total amount.

3. A non-toxic, edible, and biodegradable flying target as in claim 1 wherein said filler comprises at least one non-water soluble edible substance.

4. A non-toxic, edible, and biodegradable flying target as in claim 3 wherein said filler further comprises at least one additive.

5. A non-toxic, edible, and biodegradable flying target as in claim 4 wherein said additive is selected from the group comprising bone meal, deciduous earth, processed grits, cream of wheat, ground quick cooking rice, manure, non-toxic fertilizer, non-toxic insecticide, flake fish, squid, and squid juice.

6. A non-toxic, edible, and biodegradable flying target as in claim 4 wherein said additive is approximately 1% to 5% of the total amount of compound.

7. A non-toxic, edible, and biodegradable flying target as in claim 4 wherein said compound further includes at least one desiccant.

8. A non-toxic, edible, and biodegradable flying target as in claim 7 wherein said desiccant is selected from the group comprising salt, sugar, baking soda, or baking powder.

9. A non-toxic, edible, and biodegradable flying target as in claim 4 wherein said compound further includes at least two desiccants.

10. A non-toxic, edible, and biodegradable flying target as in claim 1 wherein said filler is selected from a group comprising of bird seed, corn, grain, processed grain products, rice, grass, and wood.

11. A non-toxic, edible, and biodegradable flying target as in claim 1 wherein said target is colorized with a non-toxic substance.

12. A non-toxic, edible, and biodegrade flying target as in claim 1 wherein said compound further includes at least one desiccant.

13. A non-toxic, edible, and biodegradable flying target as in claim 12 wherein said desiccant is selected from the group comprising salt, sugar, baking soda, or baking powder.

14. A non-toxic, edible, and biodegradable flying target as in claim 12 wherein said desiccant is approximately 1% to 8% of the total amount of compound.

* * * * *